United States Patent [19]

Sauer et al.

[11] Patent Number: 4,892,637

[45] Date of Patent: Jan. 9, 1990

[54] PLASTIC-BOUND GAS DIFFUSION ELECTRODE CONTAINING A MANGANESE OXIDE CATALYST AND PROCESS FOR PREPARING SAME

[75] Inventors: Hans Sauer, Idstein; August Winsel, Kelkheim, both of Fed. Rep. of Germany

[73] Assignee: Varta Batterie Aktiengesellschaft, Hanover, Fed. Rep. of Germany

[21] Appl. No.: 210,591

[22] Filed: Jun. 23, 1988

[30]  Foreign Application Priority Data

Jul. 3, 1987 [DE]  Fed. Rep. of Germany ....... 3722019

[51] Int. Cl.$^4$ .................... C25B 11/04; C25B 11/06
[52] U.S. Cl. ................................. 204/291; 204/294; 264/104; 264/105; 264/127; 429/40; 429/42
[58] Field of Search .................. 427/77, 126.3, 115; 502/101, 324, 507; 204/290 R, 291, 294; 429/40, 42; 264/104, 105, 127

[56]  References Cited

U.S. PATENT DOCUMENTS

| | | | |
|---|---|---|---|
| 3,978,007 | 8/1976 | Giglia et al. | 350/357 |
| 4,060,476 | 11/1977 | Treptow et al. | 204/290 F |
| 4,256,545 | 3/1981 | Deborski | 502/101 |
| 4,269,691 | 5/1981 | Deborski | 429/224 |
| 4,595,643 | 6/1986 | Koshiba et al. | 429/224 |

FOREIGN PATENT DOCUMENTS 52-058821  5/1977  Japan .

*Primary Examiner*—John F. Niebling
*Assistant Examiner*—Kathryn Gorgos
*Attorney, Agent, or Firm*—Weiser & Stapler

[57]  ABSTRACT

A process which comprises thermally decomposing in an electrically heated vibrating helical conveyor, manganese carbonate ($MnCO_3 x\ H_2O$) into a manganese oxide (predominantly of $Mn_2O_{3x}\ Mn_5O_8$) catalyst at about 500° C., and processing this catalyst into a highly active electrode paste by dry intensive mixing with a carbon-containing conductive material (carbon black, graphite or activated carbon) and PTFE as the binder. The resulting electrode paste can be rolled into a supporting net made from Ni or Ag. Also a two-step mixing process in which the catalyst powder is first premixed with small amounts of a conductive agent and a binder, compacted and granulated, and then combined with the larger residual amount of the intended amounts of conductive agent and binder in a second mixing step. The finished gas diffusion electrode has a biporous structure consisting of hydrophilic and hydrophobic pore canals, which is highly favorable for the transport processes and the electrochemical reaction. The electrode is useful in fuel cells, alkali chloride electrolyzers and air cells.

18 Claims, No Drawings

PLASTIC-BOUND GAS DIFFUSION ELECTRODE CONTAINING A MANGANESE OXIDE CATALYST AND PROCESS FOR PREPARING SAME

BACKGROUND OF THE INVENTION

The present invention generally addresses a plastic-bound gas diffusion electrode, of the type used in fuel cells, alkali chloride electrolyzers and air cells, and in particular, an electrode of this general type which contains a manganese oxide catalyst.

Gas electrodes are a recognized means for carrying out electrochemical reactions which are to take place in contact with an electrically conductive surface and in the presence of an electrolyte while a gas is being consumed or liberated. Such electrodes generally take the form of a highly porous body (e.g., made from nickel) having pore walls which are coated with a finely dispersed catalyst consisting of a precious metal. Because such catalyst electrodes permit the free access of a gas to, and unhindered removal of a gas from the electrolyte, such catalyst electrodes can be successfully used not only for electrolytic processes, but also to operate with equal success as an electrode in a fuel cell of the oxyhydrogen type, or as an oxygen depolarizer electrode in a galvanic metal-air cell. Yet another particularly interesting industrial application for such oxygen electrodes is the electrolysis of alkali chlorides.

In view of the cost of the precious metal catalysts which are used (e.g., platinum, palladium, silver or gold), many attempts have been made in the past to replace such precious metal catalysts with various manganese oxides, which also possess good electrocatalytic properties. Various crystal species of the dioxide $MnO_2$—$\alpha$-, $\beta$- and $\gamma$-$MnO_2$, of which the $\gamma$-form is the most imperfect and therefore the most active, are effective. Also found to be effective are some of the lower oxides, such as $Mn_3O_4$ (hausmannite) or $Mn_2O_3$, which are of even greater interest due to their increased stability.

U.S. Pat. No. 4,269,691 discloses a process for preparing electrodes with manganese oxide catalysts in which porous sintered nickel plates are first impregnated with solutions of manganese salts, such as manganese nitrate, manganese carbonate or the manganese salt of a fatty acid, and then dried and heated to about 700° C., at which temperature the salt residues present in the pores undergo complete pyrolytic decomposition to lower manganese oxides.

U.S. Pat. No. 4,595,643 discloses a porous air electrode which is far less expensive because the skeleton made from sintered nickel powder is omitted. The disclosed electrode is prepared from $\gamma$-MnOOH by heating this compound at temperatures between 300° C. and 400° C., making a paste from the manganese oxides which are formed with a PTFE dispersion, adding activated carbon and carbon black, kneading, and pressing the kneaded product into a metal net. The manganese oxide catalyst contained in this known plastic-bound electrode (which possesses particularly good activity) essentially represents a mixture of $Mn_5O_8$ and $Mn_2O_3$, the latter being in its stable, cubically crystallizable modification. The total composition of the catalyst approximately corresponds to a manganese oxide of the formula $MnO_x$, where $1.45 < x < 1.60$.

SUMMARY OF THE INVENTION

It is, therefore, the principal objective of the present invention to provide an oxygen electrode which can be manufactured with a manganese oxide catalyst in an efficient and more reproducible manner.

This and other objectives are accomplished in accordance with the present invention by preparing the desired electrode by thermally decomposing manganese carbonate at a temperature in the range of about 450° C. to about 550° C., and then mixing the thermal decomposition product with an appropriate conductive material and polytetrafluoroethylene (PTFE), whereupon the resulting material is formed into an appropriate shape.

For further detail regarding the preparation of such an electrode, reference is made to the detailed description which follows.

DETAILED DESCRIPTION OF PREFERRED EMBODIMENTS

Manganese carbonate (e.g., the Merck grade "manganese (II) carbonate, highest purity"), which is readily available as a commercial product, initially was shown to be a highly suitable starting material. When manganese carbonate is heated in the presence of air at temperatures between about 450° C. and about 550° C., preferably between about 510° C. and about 530° C., with a residence time of about 0.5 to about 2.0 hours in that temperature range, a catalyst material is formed (as is evidenced by its X-ray diffractogram) which can be identified as a mixture of $Mn_2O_3$ and $Mn_5O_8$ with slightly varying percentages of these two components (which can be described as $Mn_2O_3 x Mn_5O_8$ and which may contain small amounts of $MnO_2$), which completely decomposes only at temperatures above 500° C. In this respect, the catalyst material formed in accordance with the present invention is not identical to that formed in accordance with U.S. Pat. No. 4,595,643, nor is it formed from the same starting material.

An electrode prepared according to the present invention is obtained by a process which further comprises mixing the product of this thermal decomposition of manganese carbonate together with powdered carbon (carbon black and/or graphite) as the conductive material and carrier, and polytetrafluoroethylene (PTFE) as the binder, in an intensive mixing process. For this purpose, a knife mill as is described, for example, in DE-PS No. 29 41 774 may be used. Subsequently, the dry mixture is rolled into a foil, and the foil is then pressed into a metal net made of silver, nickel or silver-coated nickel.

As a suitable apparatus for carrying out the process of the present invention, there may be used a heatable, vibrating helical conveyer with a gas-tight jactet, of the type described in DE-PS No. 24 03 998. This reaction vessel proved to be particularly well suited to the thermal decomposition reaction of the maganese carbonate because such a vessel ensures continuous flow and accurate temperature control. In this reactor, the manganese carbonate is fed into the vessel (with a feed screw) and is conveyed as a thin layer on an electrically heatable vibrating helix, from top to bottom, while air or oxygen streams in counterflowing current to the powder layer, reaching an equilibrium with the manganese oxide being formed. $CO_2$ resulting from calcining the carbonate, together with the $N_2$ not taking part in the reaction, is discharged from the top of the reactor.

The most frequent particle-size (particle diameter) of the starting material ($MnCO_3H_2O$) is 24μ. During the reaction, there is formed a particle size distribution in which a broad maximum occurs between 10 and 40 μm (particle diameter), but in which the smaller particle diameters increase at the expense of the larger ones. For example, the particle size distribution at 530° C. is not very heavily dependent on the residence time, and the 50% point is located at a diameter of about 15 μm.

Analysis of the catalyst material shows that the carbonate is completely decomposed, even at 460° C., and that a mixture of $Mn_2O_3$ and $Mn_5O_8$ (with the former compound being predominant) is essentially present. This information is obtained from both a Debye-Scherrer diagram and differential thermal analysis (DTA).

The resulting material, which is continuously discharged from the helical conveyer reactor, can also be produced in a fluidized-bed reactor or in a tubular rotary furnace, and has a very high ohmic resistance of 10 kΩ/cm if measured as a pressed powder. If finely ground KOH hydrate powder or potassium permanganate powder is added to the manganese carbonate powder, a catalyst material of greatly improved conductivity (e.g., one with a resistance of 10Ω/cm) is obtained from the above-described heat treatment. This permits electrodes to be manufactured from a high-percentage catalyst material. Further according to the present invention, an insufficient intrinsic conductivity of the catalyst may be compensated by adding a carbon powder consisting of carbon black, graphite, activated carbon, or their mixtures.

In a particularly advantageous variant of the process according to the present invention, the manganese oxide catalyst is now processed into a ready-to-use electrode active paste in two steps, first by suitably mixing smaller portions of the intended total amount of the conductive agent and the PTFE with a catalyst powder (e.g., in a high-speed mixer), and by then mixing this preliminary mixture with the larger residual amounts which are left, after compacting and granulation. The residual amounts of carbon powder and PTFE are particularly advantageously premixed in a separate mixing process, and combined with the catalyst-containing preliminary mixture in a knife mill in a relatively short mixing process of about one minute (in the second mixing step). The granular structure of the preliminary mixture, which is particularly favorable for reasons to be explained below, thus remains essentially intact.

The finished electrode mixture according to the present invention preferably has a composition corresponding to between about 15 wt.% and about 65 wt.% manganese oxide catalyst and about 15 wt.% to about 35 wt.% PTFE, the balance (up to 100 wt.%) being a carbon-containing conductive agent. The amounts of catalyst and PTFE are adjusted to allow for an appropriate amount of conductive agent, such as 5 to 15 wt.%.

The PTFE powder may also be replaced with a suitable hydrophillic binder, such as polyvinyl alcohol or some other equivalent material.

The finished electrode is obtained by rolling this electrode mixture into a film or foil with a thickness of about 0.25 mm, and then rolling the resulting film or foil into a nickel net, a silver-coated nickel net, or a special steel net having, for example, a mesh size of about 0.5 mm and a wire thickness of about 0.14 mm.

The resulting electrode can also be operated (with overpressure) as an oxygen electrode or an air electrode in fuel cells or in zinc/air cells. If "pressureless" operation (at atmospheric pressure) is desired, it is recommended that a porous PTFE foil be applied on the gas side of the structure, in known manner, by rolling together in a state impregnated with gasoline, isopropyl alcohol or a chlorofluorocarbon (e.g., "Frigen", a product available from Hoechst AG). Electrodes which are prepared in this manner show excellent cathodic load potentials.

The electrode structure obtained according to the present invention is characterized in that the original catalyst particles form contiguous hydrophilic pores with the conductive material in the granule bodies, which pores extend through the entire electrode from one granule to the next. Hydrophobic gas pores are formed between the granules covered with PTFE filaments, especially in the wedge-shaped spaces which result, which contiguously supply the electrode with gas over its entire depth. The two interconnecting contiguous pore systems, one of which is hydrophilic and contains the electrolyte, and the other which is hydrophobic and contains the gaseous phase, allow at their interface for the transport processes and the electrochemical reaction between gas molecules, electrons and ions. This biporous structure is a prerequisite for the advantageous use of the electrode of the present invention, even in alkali chloride electrolyzers with scavenging of the electrolyte-carrying pores according to the Eloflux principle (known from DE-PS No. 1,164,525).

Finally, two examples describing the manufacture of 100 g portions of ready-to-roll electrode mixture are provided below. The following examples are not intended to limit the invention and are only for illustrative purposes.

EXAMPLE 1

| Mixture 1: | Mixture 2: |
|---|---|
| 30 g manganese oxide catalyst | 35 g activated carbon |
| 7 g carbon black | 3 g graphite |
| 2 g PTFE | 23 g PTFE |

The components of mixture 1 were intensively mixed in a high-speed mixer for five minutes, then compacted in a cylinder mill with a roller gap of 0.25 mm and subsequently granulated.

The components of mixture 2 were also intensively mixed for five minutes, then combined with the granulated mixture 1. This combined amount was then made into a finished mixture in the same high-speed mixer, for about one minute. An electrode was formed as described above.

EXAMPLE 2

| Mixture 1: | Mixture 2: |
|---|---|
| 30 g manganese oxide catalyst | 20 g activated carbon |
| 15 g activated carbon | 10 g carbon black |
| 5 g PTFE | 20 g PTFE |

Mixtures 1 and 2 were prepared and mixed in the same manner as in Example 1. The electrode was formed as described above.

It is advantageous to prepare each of the mixtures 2 with only about half the amounts of PTFE which are specified (i.e., with 11.5 g PTFE in Example 1 and with 10 g PTFE in Example 2), and to process these amounts with the granulated mixture 1 during the relatively short final preparation step.

It will be understood that various changes in the details, materials and arrangement of parts which have been herein described and illustrated in order to explain the nature of this invention may be made by those skilled in the art within the principle and scope of the invention as expressed in the following claims.

We claim:

1. A process for preparing a plastic-bound gas diffusion electrode, especially for fuel cells, alkali chloride electrolyzers, and air cells, which electrode contains a manganese oxide catalyst predominantly of the composition $Mn_2O_3 \times Mn_5O_8$, and which process comprises completely thermally decomposing and oxidizing manganese carbonate ($MnCO_3$) at a temperature in the range of about 450° C. to about 550° C. in the presence of air, producing a catalytic manganese oxide decomposition product constituted of $Mn_2O_3 \times Mn_5O_8$; adding polytetrafluoroethylene (PTFE) and a conductive material to the manganese oxide decomposition product; mixing and compacting the PTFE, conductive material and manganese oxide decomposition product, thereby forming a granulated first mixture; mixing with the first mixture a prepared second mixture of conductive material and PTFE, thereby forming an electrode paste mixture suitable for forming an electrode.

2. The process of claim 1 wherein the temperature range is between about 510° C. and 530° C.

3. The process of claim 2 wherein the product mixture contains an amount of manganese oxide in the range of about 15 to 65 weight percent and about 15 to 35 weight percent of PTFE.

4. The process of claim 2 wherein the first mixture comprises smaller portions of the total amount of conductive agent and PTFE which are mixed and compacted with the manganese oxide decomposition product to yield a granulated first mixture and wherein the second mixture comprises a greater residual amount of conductive agent and PTFE.

5. The process of claim 4 wherein the first mixture is compacted and granulated prior to adding the residual amounts.

6. The process of claim 4 wherein the larger residual amounts of conductive agent and PTFE are intensively mixed separately and then are charged into the granulated first mixture in a short mixing process.

7. The process of claim 4 wherein the electrode mixture contains about 15 weight percent to about 65 weight percent manganese oxide catalyst and 15 to 35 weight percent PTFE, the balance being carbon-containing conductive agent.

8. The process of claim 1 wherein the decomposition time is between about 30 minutes and about 2 hours.

9. The process of claim 8 wherein finely ground potassium hydroxide powder or potassium permanganate powder is added to the manganese carbonate powder during mixing with the PTFE.

10. The process of claim 1 wherein the temperature is above about 500° C. and the manganese carbonate is completely decomposed.

11. The process of claim 1 wherein the thermal decomposition of the manganese carbonate is carried out in a vibrating helical conveyer.

12. The process of claim 1 wherein the electrode paste mixture is formed into a foil on a metal screen.

13. The process of claim 1 wherein the particle size of the manganese oxide decomposition product catalyst is in the range of about 10 um to 40 um.

14. A biporous gas diffusion electrode of improved cathodic load potential which is gas and liquid permeable and which consists essentially of from about 15 to about 65 percent of catalytic manganese oxide as, $Mn_2O_3 \times Mn_5O_8$ with $Mn_2O_3$ being predominate, and from about 15 to 35 percent of polytetrafluoroethylene (PTFE) and a carbon-containing conductive agent.

15. The electrode of claim 14 which is a film supported by a metal screen.

16. The electrode of claim 14 wherein the electrode material is free of $MnO_2$.

17. The electrode of claim 14 wherein the electrode material contains also ground potassium hydrate powder or potassium per manganate powder.

18. The electrode of claim 14 wherein the pores of the electrode are contiguous hydrophilic pores containing electrolyte and contiguous hydrophobic pores containing a gaseous phase, said hydrophilic and hydrophobic pores being interconnected with each other.

* * * * *